US007028303B2

(12) United States Patent
Lahey et al.

(10) Patent No.: US 7,028,303 B2
(45) Date of Patent: *Apr. 11, 2006

(54) METHOD, SYSTEM, AND PROGRAM FOR PROCESSING A JOB IN AN EVENT DRIVEN WORKFLOW ENVIRONMENT

(75) Inventors: Leonard Corning Lahey, Boulder, CO (US); Robert Curt Nielsen, Longmont, CO (US); Dwight Ross Palmer, Longmont, CO (US); Adam Alvin Swartz, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/398,378

(22) Filed: Sep. 17, 1999

(65) Prior Publication Data

US 2003/0154115 A1    Aug. 14, 2003

(51) Int. Cl.
G06F 9/46        (2006.01)
(52) U.S. Cl. .................. 718/106; 709/204; 718/102
(58) Field of Classification Search .............. 705/8,
705/9, 7; 718/102, 106; 709/204
See application file for complete search history.

(56) References Cited

U.S. PATENT DOCUMENTS

| | | | |
|---|---|---|---|
| 4,853,852 A | 8/1989 | Rosen ..................... 705/10 |
| 5,276,793 A | 1/1994 | Borgendale et al. ......... 707/513 |
| 5,313,394 A | 5/1994 | Clapp ..................... 707/531 |
| 5,493,490 A | 2/1996 | Johnson ..................... 705/26 |
| 5,548,506 A * | 8/1996 | Srinivasan ..................... 705/8 |
| 5,555,496 A | 9/1996 | Tackbary et al. |
| 5,557,723 A | 9/1996 | Holt et al. ..................... 707/506 |
| 5,566,278 A | 10/1996 | Patel et al. ..................... 358/1.15 |
| 5,581,691 A * | 12/1996 | Hsu et al. ..................... 714/15 |
| 5,619,635 A | 4/1997 | Millman et al. ............. 707/530 |
| 5,627,764 A | 5/1997 | Schutzman et al. ......... 709/207 |
| 5,627,973 A | 5/1997 | Armstrong et al. ........... 705/10 |
| 5,649,220 A | 7/1997 | Yosefi |
| 5,692,206 A | 11/1997 | Shirley et al. .............. 707/531 |
| 5,696,965 A | 12/1997 | Dedrick ....................... 707/10 |
| 5,710,884 A | 1/1998 | Dedrick ..................... 709/217 |
| 5,717,923 A | 2/1998 | Dedrick ..................... 707/102 |
| 5,721,827 A | 2/1998 | Logan et al. |
| 5,724,521 A | 3/1998 | Dedrick ....................... 705/26 |

(Continued)

FOREIGN PATENT DOCUMENTS

| EP | 0982675 A2 * | 3/2000 |
| WO | WO9908205 | 2/1999 |

OTHER PUBLICATIONS

International Business Machines Corporation, IBM InfoPrint 4000 Direct Mail Printer, Sep. 1997 (c) 1997.

(Continued)

Primary Examiner—Susanna M. Diaz
(74) Attorney, Agent, or Firm—David W. Victor; Konrad Raynes & Victor, LLP

(57) ABSTRACT

Disclosed is a method, system, and program for processing a job in a workflow environment. A signal is generated when status for the job is changed from a first status to a second status. A work process associated with the second status is notified that one job had its status changed to the second status in response to the signal. The work process processes the job that had its status changed from the first status to the second status and modifies the status of the job after completing the processing of the job.

36 Claims, 5 Drawing Sheets

U.S. PATENT DOCUMENTS

| | | | |
|---|---|---|---|
| 5,729,751 | A | 3/1998 | Schoolcraft ................. 707/530 |
| 5,734,719 | A | 3/1998 | Tsevdos et al. |
| 5,740,549 | A | 4/1998 | Reilly et al. ................... 705/14 |
| 5,752,246 | A | 5/1998 | Rogers et al. ................ 707/10 |
| 5,778,368 | A | 7/1998 | Hogan et al. ................. 707/10 |
| 5,778,377 | A | 7/1998 | Marlin et al. |
| 5,790,790 | A | 8/1998 | Smith et al. ................ 709/206 |
| 5,826,020 | A * | 10/1998 | Randell ...................... 709/202 |
| 5,826,239 | A * | 10/1998 | Du et al. ........................ 705/8 |
| 5,832,504 | A | 11/1998 | Tripathi et al. ............. 707/526 |
| 5,862,404 | A | 1/1999 | Onaga ........................... 710/8 |
| 5,870,545 | A | 2/1999 | Davis et al. ................. 709/201 |
| 5,893,075 | A | 4/1999 | Plainfield et al. ............. 705/14 |
| 5,893,111 | A | 4/1999 | Sharon, Jr. et al. ...... 707/104.1 |
| 5,918,226 | A | 6/1999 | Tarumi et al. |
| 5,940,804 | A | 8/1999 | Turley et al. |
| 5,964,156 | A | 10/1999 | Smith et al. |
| 6,056,413 | A * | 5/2000 | Urso ........................... 362/106 |
| 6,058,413 | A * | 5/2000 | Flores et al. ................ 709/101 |
| 6,088,679 | A | 7/2000 | Barkley |
| 6,115,646 | A * | 9/2000 | Fiszman et al. ............. 700/181 |
| 6,144,975 | A | 11/2000 | Harris, Jr. et al. |
| 6,151,583 | A | 11/2000 | Ohmura et al. |
| 6,233,537 | B1 | 5/2001 | Gryphon et al. |
| 6,289,513 | B1 | 9/2001 | Bentwich |
| 6,301,621 | B1 * | 10/2001 | Haverstock et al. ........ 709/246 |
| 6,311,192 | B1 * | 10/2001 | Rosenthal et al. .......... 707/200 |
| 6,345,256 | B1 | 2/2002 | Milsted et al. |
| 6,370,521 | B1 | 4/2002 | Pigos et al. |
| 6,389,446 | B1 * | 5/2002 | Torii ........................... 709/100 |
| 6,466,935 | B1 | 10/2002 | Stuart et al. |
| 6,483,524 | B1 | 11/2002 | Petchenkine et al. |
| 6,578,006 | B1 * | 6/2003 | Saito et al. ..................... 705/9 |
| 2002/0046072 | A1 | 4/2002 | Arai et al. |

OTHER PUBLICATIONS

International Business Machines Corporation, Centralized Output Management, Sep. 1997 (c) 1997.

International Business Machines Corporation, InfoPrint Manager Fax and E-Mail, Aug. 1998 (c) 1998.

International Business Machines Corporation, IBM Enchances 1-to-1 Marketing Solution with New Technology and New Capabiit (c) 1998.

U.S. Appl. No. 09/422,593, filed Oct. 21, 1999, Database Driven Workflow Management System fo Generating Output Material Based on Computer Input.

U.S. Appl. No. 09/388,261, filed Aug. 31, 1999, A Workflow Management System for Generating Out Material Based on Computer Input.

Fingar, P. "A blueprint for open ecommerce," Component Strategies vol. 1, No. 5, Nov. 1998 (Abstract).

Royles, et al. "Dynamic tailoring of law related documents to user needs, " Proc. 9$^{th}$ Int'l Workshop on Database and Expert Systems Applications (Cat. No. 98EX 130), 1998. (Abstract).

Addison, E.R. "Synthesizing summary knowledge from distributed heterogeneous information sources," MILCOM 97 Proc. (Cat. No. 97CH36134), 1997. (Abstract).

Milosavljevic, et al. "Dynamic catalogues on the WWW," Computer Networks and ISDN Systems, vol. 30, No. 1-7, Apr. 1998. (Abstract).

Kipphan, H. "The future of printing: changes and challenges, techologies and markets," Proc. SPIE—Int. Soc. Opt. Eng. (USA), 1998. (Abstract).

O'Hagan, L. "Dynamic composition of personalised documents," Proc. SHARE Europe Anniversary Meeting, 1992. (Abstract).

McMahon, T. J. "Sales automation: for many companies, a 'final link' in global management, " Business Marketing, vol. 78, No. 5, May 1993. (Abstract).

Seybold Editors'Hot Picks for Seybold San Francisco Publishing 98 (online), retrieved on Aug. 29, 1999 from Internet at http://www.seyboldseminars.com/Events/sf98/hotpicks-print.htm (URL inactive).

* cited by examiner

FIG. 2

| Job ID | Current Status | Status Timestamp | Priority | Other Job Info |
|---|---|---|---|---|
| 1 | Ready | | 2 | |
| 2 | Print | | 1 | |
| 3 | Format | | 2 | |
| 4 | Ready | | 1 | |
| 5 | Print | | 2 | |

METHOD, SYSTEM, AND PROGRAM FOR PROCESSING A JOB IN AN EVENT DRIVEN WORKFLOW ENVIRONMENT

BACKGROUND OF THE INVENTION

1. Field of the Invention

The present invention relates to a method, system and program for processing a job in a workflow environment using event driven programming to route the job through the workflow environment.

2. Description of the Related Art

A workflow management system provides a defined series of tasks within an organization to produce a final outcome. Sophisticated workgroup computing applications define different work flows for different types of jobs. At each stage in the workflow, one individual process or application is responsible for a specific task. Once the task is complete, the workflow program ensures that the individuals or processes responsible for the next task are notified and receive the data needed to execute the next stage in the workflow process.

Some workflow management systems provide complex schemes involving rules and graphs to determine how to route a job through a system. Others poll a data set to determine if any new statuses or flags are set indicating a need to proceed to the next step in the workflow.

However, there is a need in the art for an improved method and system for managing the flow of work in a computing system.

SUMMARY OF THE PREFERRED EMBODIMENTS

To overcome the limitations in the prior art described above, preferred embodiments disclose a method, system, and program for processing a job in a workflow environment. A signal is generated when status for the job is changed from a first status to a second status. A work process associated with the second status is notified that one job had its status changed to the second status in response to the signal. The work process processes the job that had its status changed from the first status to the second status and modifies the status of the job after completing the processing of the job.

In further embodiments, the job status is maintained in a database table including information on the job. The work process maintains a connection with the database that enables communication with the database table. The work process modifies the status of the job after completing processing by updating the status of the job to an output status associated with another work process. Updating the status with the output status generates the signal indicating a change in status.

In still further embodiments, there are multiple work processes each associated with an status and each enabled to update the job status with the output status after completing the processing of the job. The output status for one worker is the status associated with one other worker. In such case, the job proceeds according to the order in which the work processes update the jobs with their output status.

In even further embodiments, the work process spawns a work thread to process one job in the database table having the status associated with the work process. The work process is capable of spawning multiple work threads to process different jobs having the status associated with the work process.

Preferred embodiments provide an event driven workflow system. A job enters the workflow system by having its status set to the first possible status value. Setting or updating status triggers an event which signals a worker process associated with the status to process the job. After the job is processed, the worker process updates the status to an output status which triggers another event signal to another worker process associated with the output status to proceed with processing the job. In this way, a change in the status of the job drives the workflow environment to provide a just-in-time type system for processing jobs using database technology. Preferred embodiments are implemented using push technology to notify worker processes to process the job when the job is ready for such processing.

BRIEF DESCRIPTION OF THE DRAWINGS

Referring now to the drawings in which like reference numbers represent corresponding parts throughout:

FIG. 2 illustrates a job status table used with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
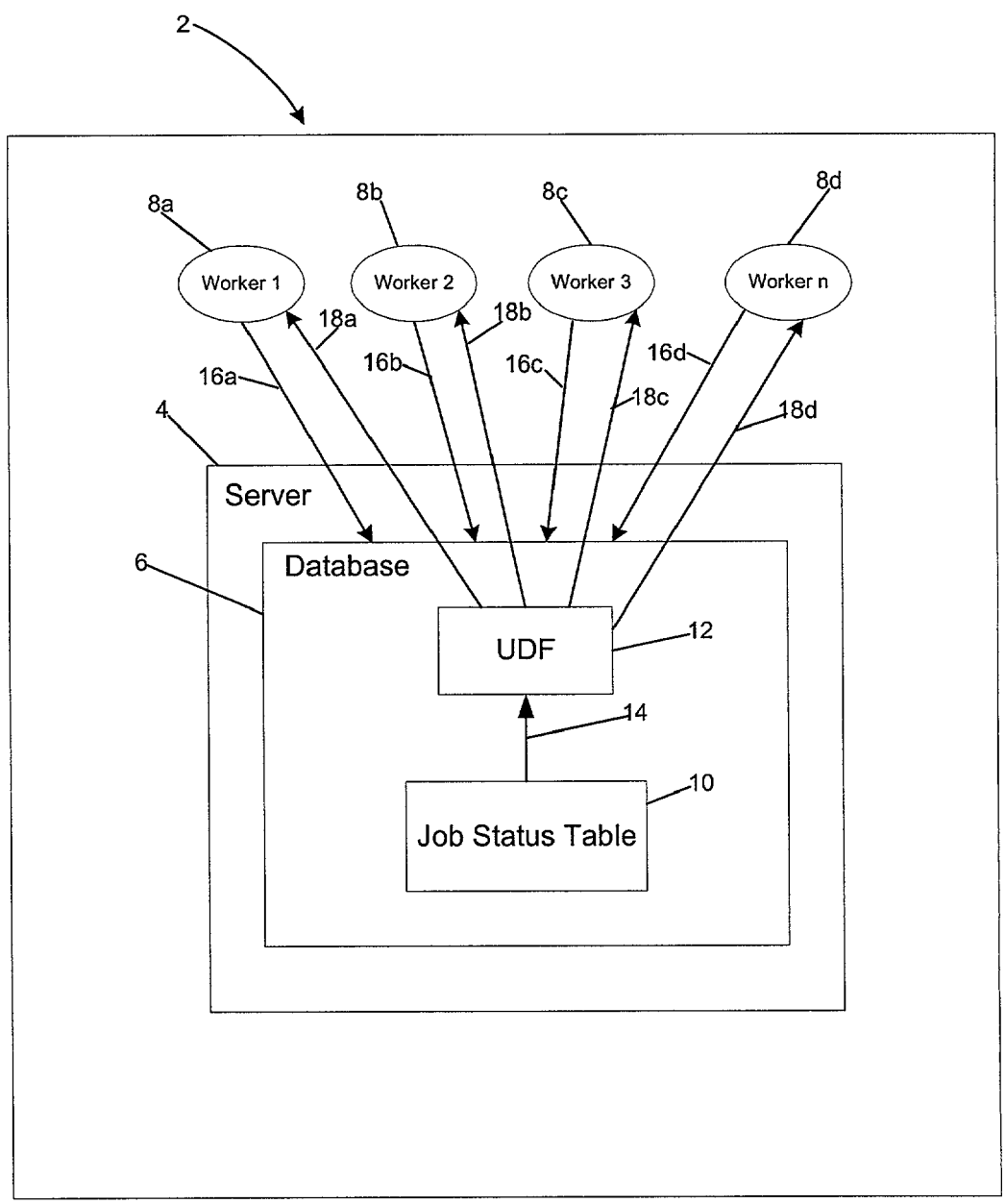
FIG. 1 illustrates a computing environment in which preferred embodiments of the present invention are implemented.

FIG. 1 illustrates a computing environment in which preferred embodiments are implemented. A computing system 2 may comprise one or more workstations, where the server 4 and database 6 are implemented in one workstation and the workers 8a, b, c, d are implemented in one or more computer workstations, which may include the server 4 or any other distributed computing device that forms the computing system 2. Different devices in the computing system 2 could communicate using any communication technology and protocol known in the art, such as a telephone line, dedicated cable or network line, etc, using any protocol known in the art including TCP/IP network (e.g., an Intranet, the Internet), LAN, Ethernet, WAN, Token Ring, etc.

The server 4 and any other clients in the computing system 2 would include an operating system, such as MICROSOFT WINDOWS 98 and WINDOWS NT, AIX, OS/390, OS/2, OS/400, and may be comprised of any suitable server and client architecture known in the art. The server 4 includes a database program 6. The database program 6 may be comprised of any database program known in the art, such as DB2, Oracle Corporation's ORACLE 8, Microsoft SQL Server, etc. The database program 6 is used to manage a job status table 10 and control the execution of a user defined function (UDF) 12 from a call within the database 6. The UDF 12 may be written in JAVA.** Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2Universal Database," by Don Chamberlin (1998), which publications are incorporated herein by reference in its entirety.

**Microsoft, Windows, and Windows NT are registered trademarks and Microsoft SQL Server is a trademark of Microsoft Corporation; DB2, AIX, OS/390, OS/400 and OS/2 are registered trademarks of IBM, MVS is a trademark of IBM; and Oracle8 is a trademark of Oracle Corporation; JAVA is a trademark of Sun Microsystem, Inc.

FIG. 2 illustrates an example of an implementation of the job status table 10, including: a Job ID column that is a job identifier, which may be the primary key for the job record in the job status table 10; a current status column including the current status of the job, e.g., ready, print, format, etc., which may describe the process currently being applied to the job; a time stamp column indicating the time the current status was applied; a priority of the job; and other job information. The job status table 10 may be a separate table that is related to another table that includes further information on each job identified in the job status table 10 or may comprise two columns of a larger table that includes further information on each job. Each job identified in the job status table 10 comprises an entity on which work is performed under computer operation such as processing data, generating output materials, forwarding data to another location for further processing, printing, working on a material or device, etc.

The workers 8a, b, c, d comprise separate application programs that perform the different work steps in the system 2. Each worker 8a, b, c, d may execute as a separate daemon process that maintains a dedicated connection 16a, b, c, d to the database 8, in a manner known in the art, to communicate with the database 6. In such case, the worker 8a, b, c, d would always remain active waiting for jobs to process. A thread is an independent flow of control that operates within the same address space as other independent flows of controls. Multiple threads may be grouped into a single entity called a process. In a multiprocessor system, multiple threads can execute at the same time, one on each processor. There may be multiple processes executing, each managing the operation of multiple threads. A process, such as a worker 8a, b, c, d process, provides a common address space and common system resources, including file descriptors, signal actions, shared libraries, and inter-process communication tools (such as message queues, pipes, semaphores, or shared memory). A thread is the schedulable entity of execution activated within a process. Thus, the worker processes 8a, b, c, d may execute a thread to perform the worker program functions to process a job and set the next status level to trigger the next worker in the workflow.

Each worker 8a, b, c, d is associated with one input status and one or more output statuses. One worker 8a, b, c, d is designated to process those jobs having the input status associated with that worker. For instance, if the status of the job is print, then the print worker having an input status of print would handle jobs having the print status. After completing processing the job, depending on the outcome, the worker 8a, b, c, d will set the job status to one of its output statuses.

Connections 16a, b, c, d between the workers 8a, b, c, d and the database 6 provide an interface between the worker 8a, b, c, d processes and the database 6 to allow communication there between in a manner known in the art. Communication can be established using database communication protocols such as Open Database Connectivity (ODBC). The user defined function (UDF) 12 may communicate with the workers 8a, b, c, d using an application communication protocol 18a, b, c, d known in the art such as Remote Method Invocation (RMI), Common Object Request Broker Architecture (CORBA), and Remote Procedure Call (RPC).

Through the database connections 16a, b, c, d, the workers 8a, b, c, d, may access the job status table 10 in the database 6. In preferred embodiments, the workers 8a, b, c, d are continuously connected to the database 6 through connections 16a, b, c, d.

In preferred embodiments, the user defined function (UDF) 12 is a program called from within the database program 6 to communicate with and instruct the workers 8a, b, c, d to notify the workers of a status change with respect to at least one job in the job status table 10. Preferred embodiments utilize a database trigger 14 to notify the UDF 12. In the IBM DB2 system, an after trigger is an object in the database 6 that is invoked indirectly by the database manager when a particular SQL statement is completed. In preferred embodiments, an instance of an SQL statement updating or inserting the status to the job status table 10 would invoke a trigger event to activate the trigger 14 that would, in turn, execute the user defined function (UDF) 12. In preferred embodiments, the trigger 14 would call the user defined function 12 with the new status entered into the status column.

The user defined function 12 would include a mapping that would map an input status of a job to a worker 8a, b, c, d designated to process jobs having the particular input status. This mapping would allow the user defined function 12 to send a message to the worker 8a, b, c, or d designated to process the current status. The user defined function 12 would send the worker 8a, b, c, information such as the job status.

Figure 3:
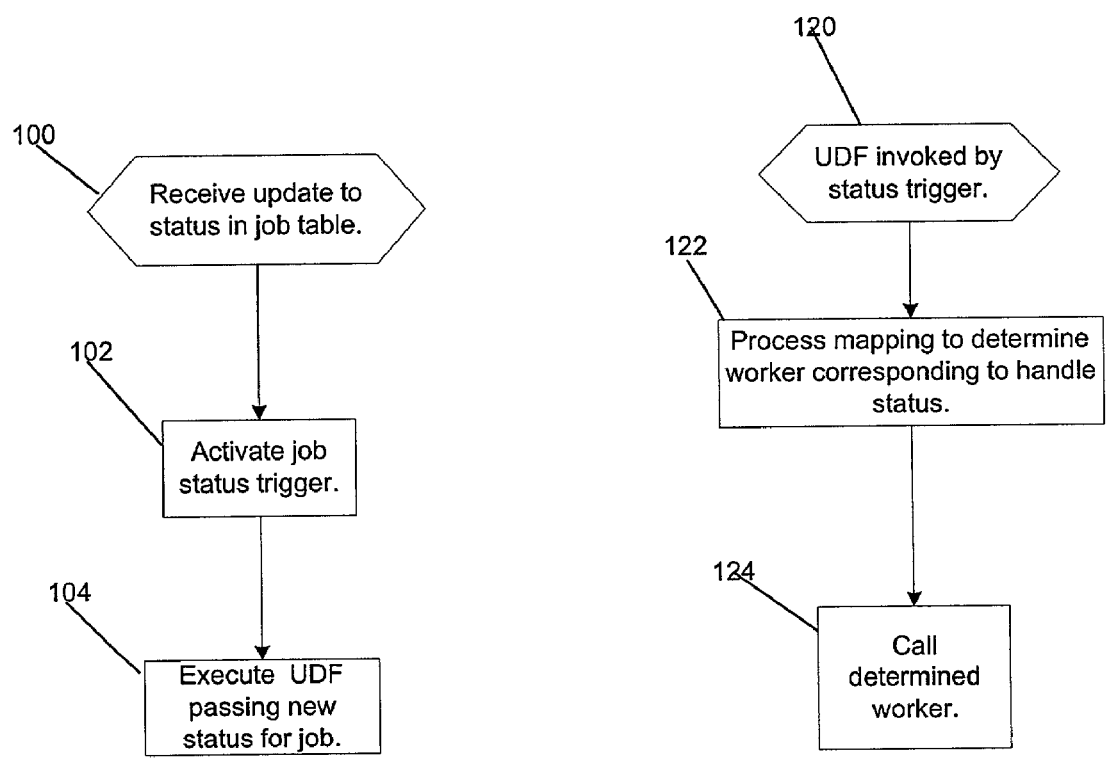
FIG. 3 illustrates logic implemented in the database and user defined function (UDF) to manage workflow of jobs in accordance with preferred embodiments of the present invention.

FIG. 3 illustrates logic implemented in the database 6 and user defined function (UDF) 12 to process changes to the job status table 10. With respect to the database 6, control begins at block 100 where the database 6 receives an update to the status column of a job. This update could be setting the job to the initial status of ready, or any other possible status value. This updating or setting of the status in the job status table 10 is a triggering event that activates the job status trigger (at block 102). The activated job status trigger then executes (at block 104) the UDF 12 and passes to the UDF 12 the new status for the job. In alternative embodiments, the job status trigger could pass the UDF additional information such as the job ID of the job having its status changed.

With respect to the UDF 12, at block 120 in FIG. 3, the UDF 12 is called by the job status trigger, which passes the new job status. The UDF 12 then processes a mapping (at block 122) encoded in the UDF 12 program to determine the worker process 8a, b, c, d designated to handle the status passed from the database 6. The UDF 12 program then calls or sends a message to the worker process 8a, b, c or d whose input status is the new job status. Calling the worker 8a, b, c or d would cause the worker to query the database for any jobs having the input status for that worker if the worker 8a, b, c, d was not already actively processing the job status table 12. Alternatively, the UDF 12 could further pass the job ID, and then the worker 8a, b, c, d would access the specific job in the job status table 10, instead of querying the job status table 12 for the highest priority job having the input status.

When a job enters the workflow environment, its status would be set to ready to cause the worker that performs the first operations in the workflow process to process the new job. Each worker 8a, b, c, d processes jobs in a similar manner, although the actual operations will vary depending on the specific operations performed by the worker 8a, b, c, d in the workflow process. To define a worker 8a, b, c, d, the conditions must be specified in the database for the trigger that notifies the UDF 12 to notify the appropriate worker. Each job may have an associated priority, shown in the priority column of the job status table 12 in FIG. 2. In such case, the worker 8a, b, c, d would query the job status table 12 for the highest priority job having the worker's input status. If a time stamp is provided indicating when the job was added to the table 12, then the worker 8a, b, c, d could query the table 12 first on priority, then on the oldest time stamp, or longest pending job.

As discussed, after processing a job, the worker changes the job status to one of the worker's output statuses. In all cases, the worker 8a, b, c, d must change the status for the job in the job status table 10, otherwise the worker 8a, b, c, d will continue processing the job if its status remains unchanged.

Upon system initialization, the workers 8a, b, c, d would be activated at the same time to allow a job to flow through and be processed by all workers. Any workers 8a, b, c, d that are not activated could form a bottleneck in the workflow system. As discussed, in preferred embodiments, the workers 8a, b, c, d are daemon processes executing in one or more systems that remain active at all times. The activated worker 8a, b, c, d establishes a connection 16a, b, c, d with the database 6.

FIG. 3 illustrates logic implemented in a worker process to participate in the workflow management system. Control begins at block 150 with the worker 8a, b, c, d waiting for a call from the UDF 12. At this state, the worker is sleeping and not processing the job status table 12. In response to receiving a signal from the UDF 12, the worker 8a, b, c, d queries (at block 154) the job status table 12 for a job having the input status for the worker. The worker 8a, b, c, d would ignore a call from the UDF 12 received when the worker 8a, b, c, d is actively querying and processing the job status table 12. The worker 8a, b, c, d then determines (at block 156) whether there are any unlocked jobs in the job status table 12 having the input status. If not, then the worker 8a, b, c, d returns to block 150 where it enters sleep mode waiting for the next signal from the UDF 12.

If there are unlocked jobs having the input status, then the worker 8a, b, c, d accesses (at block 160) the highest priority job having the input status, marks (at block 164) the job as locked, and spawns (at block 166) a new thread to process the job. The worker 8a, b, c, d would pass the thread the database connection handle to allow the thread to access the database 6 through the connection 16a, b, c, d of the worker process 8a, b, c, d. The connection handle is a data object that contains information associated with a database connection, including general status information, transaction status, and diagnostic information. As discussed, if there are multiple jobs having the worker status, then the worker process 8a, b, c, d can spawn multiple, concurrently executing threads to process multiple jobs during the workflow process. From block 166 the worker 8a, b, c, d would return to block 156 to process any further unlocked jobs having the input status. If there are no more jobs with the input status, then the worker 8a, b, c, d returns to the sleep mode at block 150. With the logic of FIG. 4 the workers 8a, b, c, d continue querying the table for active jobs. If there are no further jobs in the job status table 10 having the status associated with the worker 8a, b, c, d, then the worker goes into sleep mode until receiving a signal from the UDF 12 program indicating the occurrence of an update to the input status associated with the worker 8a, b, c, d.

As discussed, in alternative embodiments, the UDF 12 can pass the worker 8a, b, c, d the job ID that had its status changed to the worker's input status. In such case, the worker 8a, b, c, d would query the job status table 12 for the specific job having the passed job ID and process that job alone. After processing that job, the worker 8a, b, c, d could go back to sleep waiting for a call for the next job. In still further embodiments, the UDF 12 could call all workers 8a, b, c, d to process the job status table after being executed by the job status trigger.

When processing the job status table 12, the worker process 8a, b, c, d could spawn a thread for each located unlocked job in the job status table 12 having the input status. To prevent a worker process 8 from spawning enough threads to substantially degrade system performance, there can be a limit on the maximum number of threads a worker 8a, b, c, d can spawn to limit the resources allocated to each worker 8a, b, c, d. In alternative embodiments, the worker process 8a, b, c, d could process the job itself and perform the operations described with respect to the thread. Alternatively, the worker process 8a, b, c, d could spawn multiple instances of itself to have multiple instances of the worker simultaneously querying and processing jobs in the job status table 12. In cases where multiple threads or processes are processing jobs, the locking feature is used to prevent to processes or threads from simultaneously accessing the same job.

Figure 4:
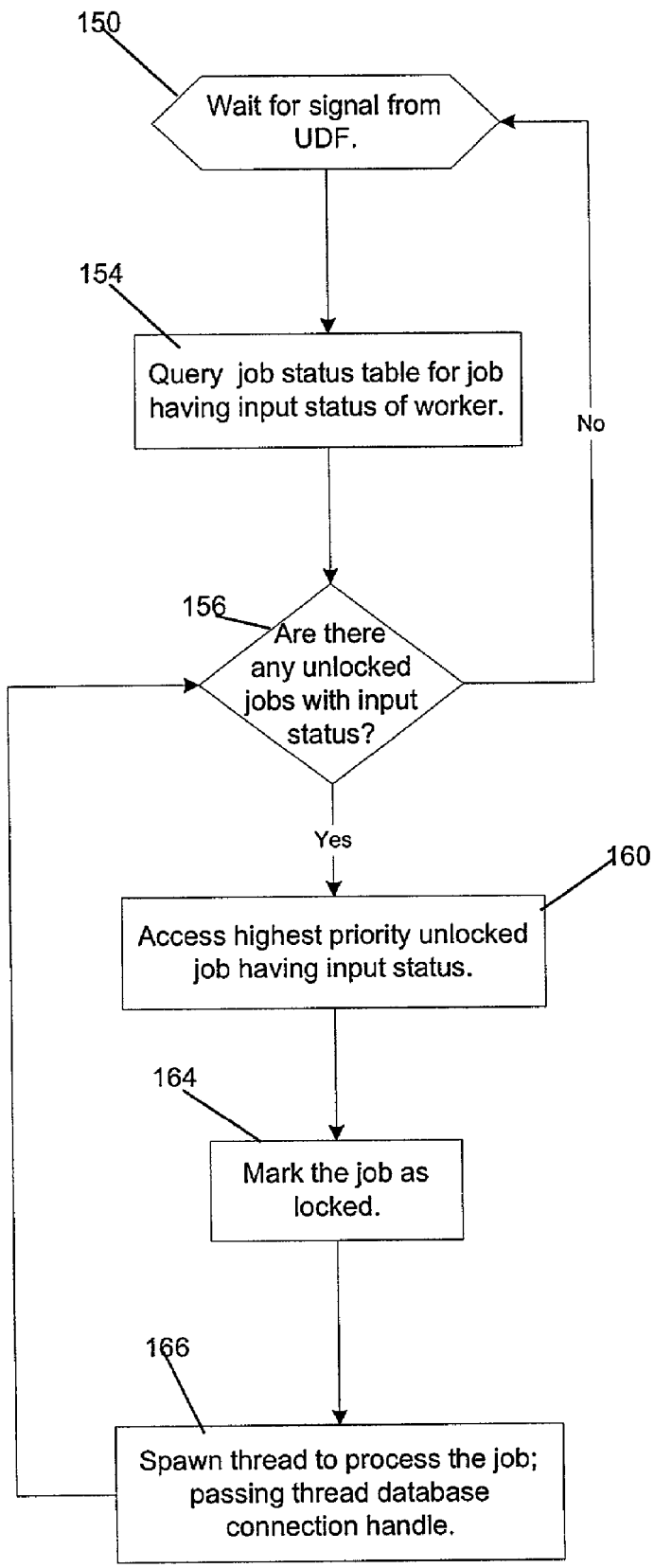
FIG. 4 illustrates logic implemented in a worker process to process a job in accordance with preferred embodiments of the present invention.
Figure 5:
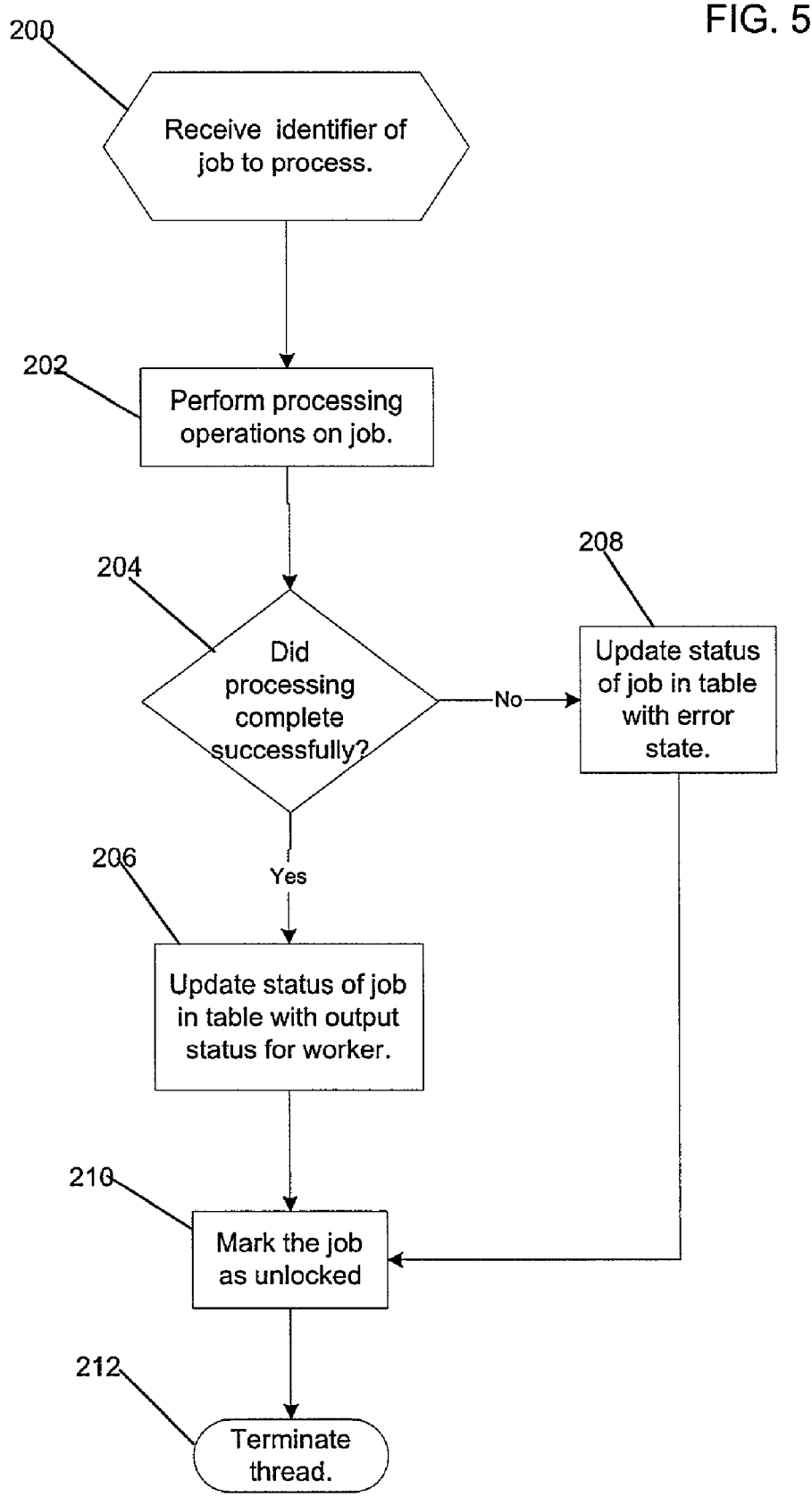
FIG. 5 illustrates logic implemented in a worker thread to process a job in accordance with preferred embodiments of the present invention.

FIG. 5 illustrates logic implemented in a thread spawned by a worker process 8a, b, c, d at block 166 in FIG. 4. At block 200, the thread is spawned. The worker process 8a, b, c, d passes the identifier of the job to process. The thread then processes (at block 202) the job according to the actions encoded in the worker 8a, b, c, d spawning the thread in the workflow management system. For instance, in large scale printing systems, after a job is specified in a database, a first worker could generate the document, a second worker could process the job to format for a particular output device, and a third worker could route the formatted job to the output device. The thread at block 202 would perform the operations designated to the worker spawning the thread. If (at block 204) the processing completed successfully, then the thread updates the status for the job in the job status table 10 with the output status for the worker. This output status is associated with the next worker in the workflow that will process the job next. In this way, the input and output statuses defined for the workers 8a, b, c, d defines the flow of jobs to and from the workers 8a, b, c, d as defined by the workflow management system.

If the job did not complete successfully, then the thread would update the status for the job (at block 208) to the error state, which would trigger a worker that handles the error state to process the job in such error state. After updating the status at block 206 or 208, the thread will mark (at block 210) the job as unlocked to allow the next worker in the workflow to access the job and terminate (at block 212) the thread.

Preferred embodiments provide a database event driven system to automatically route a job through a series of operations or workflow to process the job in a just-in-time manner. The job status table 10 could contain information on the job utilized by the workflow threads to identify the location of the job in the workflow environment. As discussed, setting the status to an error state would trigger the database to signal the UDF 12 program to signal the worker handling error states. If the error worker corrected the problem causing the error state, then the error worker could set the status to ready and resubmit the job to the beginning, or at any other point, in the workflow process. With preferred embodiments, there is no need to poll the job status table 10 at intervals as the database triggers cause the signaling of the workers to process a job, thus utilizing a "push" versus a "pull" approach to workflow management and processing. Further, with the preferred embodiments the threads do not need to establish separate connections with the database 6 and may just use the connection 16*a, b, c, d* established by the worker process 8*a, b, c, d*.

In preferred embodiments, the database 6 would maintain an additional job history table that has a field for the job id, the status, and a time stamp when the status was set. Every time the status for the job is changed, the new status is added to the job history table. This additional table may be used for tracking purposes to allow a tracking program to determine where a job has been and its current position in the workflow process. An additional database trigger could be used that executes whenever the job status is changed, along with the job status trigger, and writes information to the job history table on the new status, including the job ID, new status, and a time when the new status was set.

With preferred embodiments, the workflow and order of job processing may readily be modified by modifying the mapping in the UDF 12 program to add, remove or modify the statuses associated with workers. This would alter the definition of which worker is invoked for a particular status. Further, preferred embodiments are completely event driven. When a worker is finished processing a job and changes the job status, then the job is passed to the next worker for this next state to process. No high level control program polling the job status table is needed.

The work processed by the workers could be any program or device that is modified according to computer processing. The work entity may be a computer readable file on which processing and routing operations are performed to process the data in the file and route the file to its ultimate, intended destination. Alternatively, the work entity may be a physical device that is processed through the workflow system. For instance, the job may be a semiconductor that flows through different work stations for sputtering and fabrication operations; the job may be a circuit board or any other device that is processed on an automated assembly line. Each worker 8*a, b, c, d* may manage the operations of each station in the automated assembly line. In such embodiments, the job status table indicates the status of the device being processed. The workers would process the device and route it to a next destination in response to signals from the event driven database. For instance, if the device is an electronic device, then the different workers may cause machine tools and other hardware to perform one or more operations on the device before having the next worker perform the next step of processing the electronic device. In such embodiments, the workflow system of the invention is used to rout a piece of work through an automated assembly system of robotic and non-robotic workers assembling and otherwise acting upon the work entity.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments, the status was indicated in a relational database program that includes triggers that respond to updates to the status fields in a database table. In further embodiments, the status information and event driven triggers may be implemented in data structures other than database structures.

The workers 8*a, b, c, d* were describes as daemon processes that maintain a constant connection with the database. However, in alternative embodiments, the workers 8*a, b, c, d* may comprise application programs that are initialized in response to the trigger event and have to reestablish communication with the database upon each initialization.

In summary, preferred embodiments disclose a method, system, and program for processing a job in a workflow environment. A signal is generated when status for the job is changed from a first status to a second status. A work process associated with the second status is notified that one job had its status changed to the second status in response to the signal. The work process processes the job that had its status changed from the first status to the second status and modifies the status of the job after completing the processing of the job.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a job, comprising;
   generating, with a computing system, a signal when status for the job is changed from a first status to a second status in a job status table, wherein each status for the job is associated with a single work process for processing the job among multiple work processes, wherein each status refers to a next process to be performed by the single work process associated with the status, wherein each work process is an application program, wherein the job status table identifies jobs on which work is performed, and wherein the signal is generated by an event trigger in a database at the computing system that is invoked in response to the change in status of the job in the job status table;
   identifying using a mapping, with a user defined function, a single work process for processing the job based on the second status, wherein the second status is associated with the identified work process, wherein the user defined function is invoked by the event trigger with the second job status and wherein the mapping maps an input status of a job to a work process;

notifying, with the user defined function, the work process associated with the second status that one job had its status changed to the second status in response to the signal;

processing, with the work process, the job that had its status changed from the first status to the second status, wherein the work process queries the job status table to identify the job having the second status which is associated with that work process and to obtain job information in response to the notification; and modifying, with the work process, the status of the job in the job status table after completing the processing of the job, wherein each work process is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner.

2. The method of claim 1, wherein the signal is transmitted to a routing process and indicates the second status, further comprising:

processing with the routing process the mapping associating each status with one work process in response to receiving the signal; and determining from the mapping one work process associated with the second status, wherein the determined work process is notified of the job.

3. The method of claim 1, wherein job status is maintained in a database table including information on the job, further comprising maintaining, with the work process, a connection with the database that enables communication with the database table, wherein modifying the status of the job with the work process after completing processing comprises updating the status of the job with the work process to an output status associated with another work process, and wherein updating the status with the output stabs generates the signal indicating a change in status.

4. The method of claim 3, wherein the signal is generated by an event trigger in the database at the computing system that responds to an update to the status of the job in the database table.

5. The method of claim 3, wherein there are multiple work processes, wherein each work process is enabled to update the job status with one associated output status after completing the processing of the job, wherein the output status for one work process is the input status associated with one other work process, and wherein the definition of input and output statuses for work processes, defines the workflow of the job.

6. The method of claim 3, further comprising the work process performing:

determining, with the computing system, whether the work process completed processing the job successfully; and updating, with the computing system, the status of the job to en error status if the work process did not complete processing the job successfully, wherein the status of the job is updated with one output status associated with the work process if the job work process completed processing the job successfully.

7. A method for processing a job, comprising;

generating a signal, with a computing system, when status for the job is changed from a first status to a second status in a database table, wherein each status for the job is associated with a single work process for processing the job among multiple work processes, wherein each status refers to a next process to be performed by the single work process associated with the status, wherein each work process is an application program, wherein the database table identifies jobs on which work is performed, and wherein the signal is generated by an event trigger in a database at the computing system that is invoked in response to the change in status of the job in the job status table;

identifying using a mapping, with a user defined function, a single work process for processing the job based on the second status, wherein the second status is associated with the identified work process, wherein the user defined function is invoked by the event trigger with the second job status and wherein the mapping maps an input status of a job to a work process;

notifying, with the user defined function, the work process associated with the second status that one job had its status changed to the second status in response to the signal in response to the notification;

processing, with the work process, the job that had its status changed from the first status to the second status, wherein the work process queries the database table to identify the job having the second status which is associated with that work process and to obtain job information;

modifying, with the work process, the status of the job in the database table after completing the processing of the job, wherein each work process is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner;

wherein job status is maintained in the database table including information on the job and maintaining, with the work process, a connection with the database that enables communication with the database table, wherein modifying the status of the job after completing processing comprises updating the status of the job to an output status associated with another work process, and wherein updating the status with the output status generates the signal indicating a change in status;

wherein the work process further comprises performing:

determining whether the work process completed processing the job successfully; and updating the status of the job to an error status if the work process did not complete processing the job successfully, wherein the status of the job is updated with one output status associated with the work process if the job work process completed processing the job successfully; and wherein an error work process is associated with the error status, wherein updating the job to the error status causes the notification of the error work process, and wherein the error work process further comprises performing:

performing error recovery operations on the job;

determining whether the error recovery operations corrected the job; and setting the jobs status of the corrected job to a first possible status in the workflow.

8. The method of claim 3, wherein the work process further performs:
   processing the jobs having the status associated with the work process;
   terminating processing of the database table if there are no further jobs in the database table having the status associated with the work process; and
   querying the database table for additional jobs after receiving the notification.

9. The method of claim 8, wherein the work process spawns a work thread to process one job in the database table having the status associated with the work process, wherein the work process is capable of spawning multiple work threads to process different jobs having the status associated with the work process.

10. The method of claim 1, wherein the job comprises a data file, wherein at least one work process processes the data file to alter its format and at least one other work process processes the data file in the altered format to transmit the data file to an output device.

11. The method of claim 10, wherein at least two work processes process the job at different devices in communication over a network, further comprising accessing the job, with one of the work processes, from another device over the network to process the job at the device on which that work process executes.

12. The method of claim 1, further comprising:
   adding, with the computing system, a status update to a list providing status updates for each job; and
   using the list to determine how the job has been processed by the work processes.

13. A system for processing a job, comprising;
   means for generating, with a computing system, a signal when status for the job is changed from a first status to a second status in a job status table, wherein each status for the job is associated with a single work process for processing the job among multiple work processes, wherein each status refers to a next process to be performed by the single work process associated with the status, wherein each work process is an application program, wherein the job status table identifies jobs on which work is performed, and wherein the signal is generated by an event trigger in a database at the computing system that is invoked in resoonse to the change in status of the job in the job status table;
   means for identifying using a mapping, with a user defined function, a single work process for processing the job based on the second status, wherein the second status is associated with the identified work process, wherein the user defined function is invoked by the event trigger with the second job status and wherein the mapping maps an input status of a job to a work process;
   means for notifying, with the user defined function, the work process associated with the second status that one job had its status changed to the second status in response to the signal in response to the notification;
   means for processing, with the work process, the job that had its status changed from the first status to the second status, wherein the work process queries the job status table to identify the job having the second status which is associated with that work process and to obtain job information; and
   means for modifying, with the work process, the status of the job in the job status table after completing the processing of the job, wherein each work process Is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner.

14. The system of claim 13, wherein the signal is transmitted to a routing process and indicates the second status, further comprising:
   means for processing with the routing process the mapping associating each status with one work process in response to receiving the signal; and
   mean for determining from the mapping one work process associated with the second status, wherein the determined work process is notified of the job.

15. The system of claim 13, wherein job status is maintained in a database table including information on the job, further comprising means for maintaining, with the work process, a connection with the database that enables communication with the database table, wherein the means for modifying the status of the job, with the work process, after completing processing comprises updating the status of the job to an output status associated with another work process, and wherein the means for updating, with the work process, the status with the output status generates the signal indicating a change in status.

16. The system of claim 15, wherein the signal is generated by an event trigger in the database that responds to an update to the status of the job in the database table.

17. The system of claim 15, wherein there are multiple work processes, wherein each work process is enabled to update the job status with one associated output status after completing the processing of the job, wherein the output status for one work process is the input status associated with one other work process, and wherein the definition of input and output statuses for work processes defines the workflow of the job.

18. The system of claim 15, further comprising:
   means for determining, with the computing system, whether the work process completed processing the job successfully; and
   means for updating the status of the job to an error status if the work process did not complete processing the job successfully, wherein the status of the job is updated with one output status associated with the work process if the job work process completed processing the job successfully.

19. A system for processing a job, comprising;
   means for generating, with a computing system, a signal when status for the job is changed from a first status to a second status in a database table, wherein each stabs for the job is associated with a single work process for processing the job among multiple work processes, wherein each status refers to a next process to be performed by the single work process associated with the status, wherein each work process is an application program, wherein the database table identifies jobs on which work is performed, and wherein the signal is generated by an event trigger in a database at the computing system that is invoked in response to the change in status of the job in the job status table;
   means for identifying using a mapping, with a user defined function, a single work process for processing the job based on the second status, wherein the second status is associated with the identified work process, wherein the user defined function is invoked by the event trigger with the second job status and wherein the mapping maps an input status of a job to a work process;

means for notifying, with the user defined function, the work process associated with the second status that one job had its status changed to the second status in response to the signal in response to the notification;

means for processing, with the work process, the job that had its status changed from the first status to the second status, wherein the work process queries the database table to identify the job having the second status which is associated with that work process and to obtain job information;

means for modifying, with the work process, the status of the job in the database table after completing the processing of the job, wherein each work process is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner;

wherein job status is maintained in the database table including information on the job, further comprising means for maintaining, with the work process, a connection with the database that enables communication with the database table, wherein the means for modifying the status of the job after completing processing comprises updating the status of the job to an output status associated with another work process, and wherein the means for updating the status with the output status generates the signal indicating a change in status;

means for determining whether the work process completed processing the job successfully;

means for updating the status of the job to an error status if the work process did not complete processing the job successfully, wherein the status of the job is updated with one output status associated with the work process if the job work process completed processing the job successfully; and wherein an error process is associated with the error status, wherein updating the job to the error status causes the notification of the error work process, further comprising:

means for performing error recovery operations on the job;

means for determining whether the error recovery operations corrected the job; and means for setting the jobs status of the corrected job to a first possible status in the workflow.

20. The system of claim 15, further comprising:
means for querying the database table for jobs having the status associated with the work process;
means for processing the jobs having the status associated with the work process;
means for terminating processing of the database table if there are no further jobs in the database table having the stabs associated with the work process; and
means for querying the database table for additional jobs after receiving the notification.

21. The system of claim 20, wherein the work process spawns a work thread to process one job in the database table having the status associated with the work process, and wherein the work process is capable of spawning multiple work threads to process different jobs having the status associated with the work process.

22. The system of claim 13, wherein the job comprises a data file, wherein at least one work process processes the data file to alter its format and at least one other work process processes the data file in the altered format to transmit the data file to an output device.

23. The system of claim 22, wherein at least two work processes process the job at different devices in communication over a network, further comprising means for accessing the job from, another device over the network to process the job at the device on which that work process executes.

24. The system of claim 13, further comprising:
means for adding a status update to a list providing status updates for each job; and
means for using the list to determine how the job has been processed by the work processes.

25. An article of manufacture for processing a job, the article of manufacture comprising computer usable media including at least one computer program and at least one work process embedded therein that causes at least one computer to perform:

generating a signal when status for the job is changed from a first status to a second status in a job status table, wherein each status for the job is associated with a single work process for processing the job among multiple work processes, wherein each status refers to a next process to be performed by the single work process associated with the status, wherein each work process is an application program, wherein the job status table identifies jobs on which work is performed, and wherein the signal is generated by an event trigger in a database at the computing system that is invoked in response to the change in status of the job in the job status table;

identifying using a mapping a singe work process for processing the job based on the second status, wherein the second status is associated with the identified work process;

notifying the work process associated with the second status that one job had its status changed to the second status in response to the signal in response to the notification;

processing, with the work process, the job that had its status changed from the first status to the second status, wherein the work process queries the job status table to identify the job having the second status which is associated with that work process and to obtain job information; and modifying, with the work process, the status of the job in the job status table after completing the processing of the job, wherein each work process is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner.

26. The article of manufacture of claim 25, wherein the signal is transmitted to a routing process and indicates the second status, further comprising:
processing with the routing process the mapping associating each status with one work process in response to receiving the signal; and determining from the mapping one work process associated with the second status, wherein the determined work process is notified of the job.

27. The article of manufacture of claim 25, wherein job status is maintained in a database table including information on the job, further comprising maintaining, with the work process, a connection with the database that enables communication with the database table, wherein modifying the status of the job after completing processing comprises updating the status of the job to an output status associated with another work process, and wherein updating the status with the output status generates the signal indicating a change in status.

28. The article of manufacture of claim 27, wherein the signal is generated by an event trigger in the database that responds to an update to the status of the job in the database table.

29. The article of manufacture of claim 27, wherein there are multiple work processes, wherein each work process is enabled to update the job status with one associated output status after completing the processing of the job, wherein the output status for one work process is the input status associated with one other work process, and wherein the definition of input and output statuses for work processes defines the workflow of the job.

30. The article of manufacture of claim 27, further comprising the work process performing:
   determining whether the work process completed processing the job successfully; and
   updating the status of the job to an error status if the work process did not complete processing the job successfully, wherein the status of the job is updated with one output status associated with the work process if the job work process completed processing the job successfully.

31. An article of manufacture for processing a job, the article of manufacture comprising computer usable media including at least one computer program and at least one work process embedded therein that causes at least one computer to perform:
   generating a signal when status for the job is changed from a first status to a second status in a database table, wherein each status for the job is associated with a single work process for processing the job among multiple work processes, wherein each status refers to a next process to be performed by the single work process associated with the status, wherein each work process is an application program, and wherein the database table identifies jobs on which work is performed, and wherein the signal is generated by an event trigger in a database at the computing system that is invoked in response to the change in status of the job in the job status table;
   identifying using a mapping a single work process for processing the job based on the second status, wherein the second status is associated with the identified work process;
   notifying the work process associated with the second status that one job had its status changed to the second status in response to the signal in response to the notification;
   processing, with the work process, the job that had its status changed from the first status to the second status, wherein the work process queries the database table to identify the job having the second status which is associated with that work process and to obtain job information;
   modifying, with the work process, the status of the job in the database table after completing the processing of the job, wherein each work process is associated with one input status and one or more output statuses, wherein the modified status of the job is associated with another work process, wherein the mapping may be modified to perform at least one of adding, removing, and modifying statuses associated with work processes to modify an order of the job processing, and wherein the job is processed in a just-in-time manner;
   wherein job status is maintained in the database table including information on the job, further comprising maintaining, with the work process, a connection with the database that enables communication with, the database table, wherein modifying the status of the job after completing processing comprises updating the status of the job to an output status associated with another work process, and wherein updating the status with the output stabs generates the signal indicating a change in status;
   wherein the work process further comprises performing:
      determining whether the work process completed processing the job successfully; and
      updating the status of the job to an error status if the work process did not complete processing the job successfully, wherein the status of the job is updated with one output status associated with the work process if the job work process completed processing the job successfully; and
   wherein one work process is an error work process is associated with the error status, wherein updating the job to the error status causes the notification of the error work process, wherein the error work process further comprises performing:
   performing error recovery operations on the job;
   determining whether the error recovery operations corrected the job; and
   setting the jobs status of the corrected job to a first possible status in the workflow.

32. The article of manufacture of claim 27, wherein the work process further performs:
   querying the database table for jobs having the status associated with the work process;
   processing the jobs having the status associated with the work process;
   terminating processing of the database table if there are no further jobs in the database table having the status associated with the work process; and
   querying the database table for additional jobs after receiving the notification.

33. The article of manufacture of claim 32, wherein the work process spawns a work thread to process one job in the database table having the status associated with the work process, wherein the work process is capable of spawning multiple work threads to process different jobs having the status associated with the work process.

34. The article of manufacture of claim 25, wherein the job comprises a data file, wherein at least one work process processes the data file to alter its format and at least one other work process processes the data file in the altered format to transmit the data file to an output device.

35. The article of manufacture of claim 34, wherein at least two work processes process the job at different devices in communication over a network, further comprising accessing the job from another device over the network to process the job at the device on which that work processes executes.

36. The article of manufacture of claim 25, further comprising:
adding a status update to a list providing status updates for each job; and
using the list to determine how the job has been processed by the work processes.

* * * * *